Jan. 18, 1955  A. A. CONCEPCION  2,699,901
APPARATUS FOR MAKING WICKER BALLS AND THE LIKE
Filed April 10, 1953  2 Sheets-Sheet 1

INVENTOR
Alberto A. Concepcion

BY *Lancaster, Allwine & Rommel*
ATTORNEYS

Jan. 18, 1955   A. A. CONCEPCION   2,699,901
APPARATUS FOR MAKING WICKER BALLS AND THE LIKE
Filed April 10, 1953   2 Sheets-Sheet 2
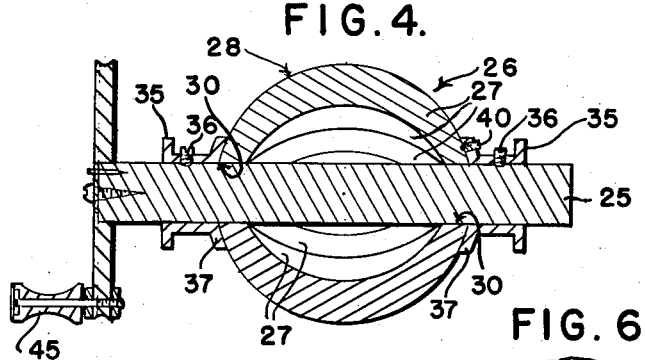
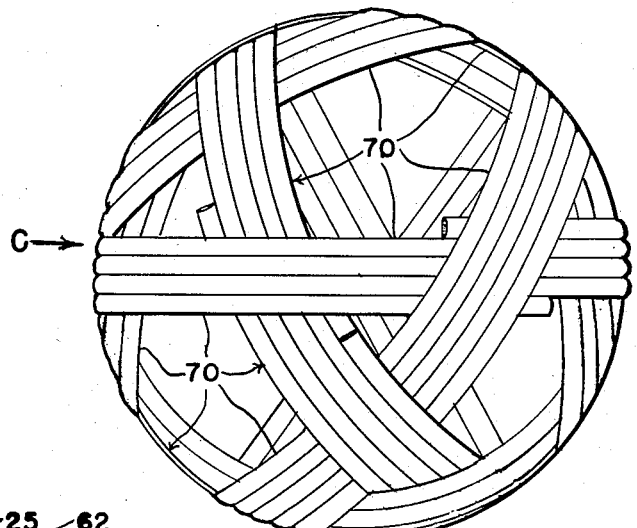
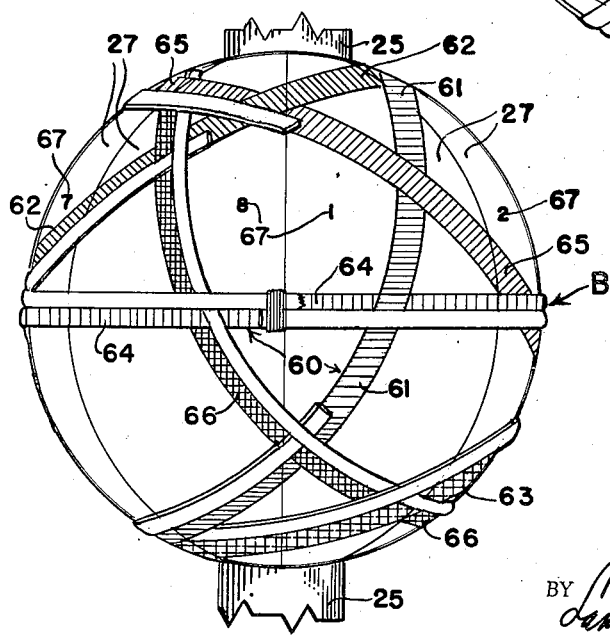
INVENTOR
Alberto A. Concepcion
ATTORNEYS

United States Patent Office 2,699,901
Patented Jan. 18, 1955

2,699,901

APPARATUS FOR MAKING WICKER BALLS AND THE LIKE

Alberto A. Concepcion, Detroit, Mich.

Application April 10, 1953, Serial No. 347,919

2 Claims. (Cl. 242—3)

This invention relates to apparatus for forming hollow wickerwork bodies of interlaced strips or strands and having an opening or openings between certain of the strips or strands. Such bodies may be for example, substantially cylindrical wicker balls of interlaced rattan, having regularly spaced-apart interstices and employed in playing games.

An important object of the invention is to provide an apparatus for forming a hollow body of strips or strands interlaced upon a sectional core or former and with the body provided with an opening or openings, which core may be withdrawn, section by section, through the opening or openings of the formed body.

Another important object is to provide an apparatus as heretofore described which includes pressure means to cause the strips or strands to hug the surface of the core or former during formation of the hollow body and aid in providing a plurality of substantially uniform bodies, one after another. That is, if the bodies are to be substantially spheres, all will be of substantially the same circumferences.

Still another important object is to provide an apparatus as heretofore described which permits the formed hollow body to be readily separated from the apparatus without damage to the apparatus whereupon the apparatus may be quickly set up again for the formation of another like hollow body.

Additionally, an important object is to provide an apparatus for forming a substantially spherical hollow body of pliable strips or strands by interlacing the strips or strands upon a substantially spherical core of segmental sections mounted for rotation upon a shaft, and leaving a plurality of spaced-apart openings through the body, whereupon the shaft is withdrawn, through two of the openings and the segmental sections are withdrawn, section by section, through one or more of the openings.

Furthermore, an important object is to provide an apparatus as last described, which includes regulated pressure means for causing the pliable strips or strands to contact the surface of the core or former and aid in providing a truly spherical body.

Since some manual operations are required in the formation of the hollow body, an important object of the invention is to provide an apparatus in which the parts are so arranged that they will not impede the hands of the operator while following the manual operations.

Other objects and advantages of the invention will be apparent during the course of the following detailed description of the invention taken in connection with the accompanying drawings forming a part of this disclosure and in which drawing:

Fig. 4 is an enlarged transverse section of the sectional core and the shaft of the apparatus removed from the apparatus.

Fig. 5 is a fragmentary top plan of that portion of the apparatus containing the core, with portions of several strips in position.

Fig. 6 is an elevation of one product of the apparatus.

Figure 1:
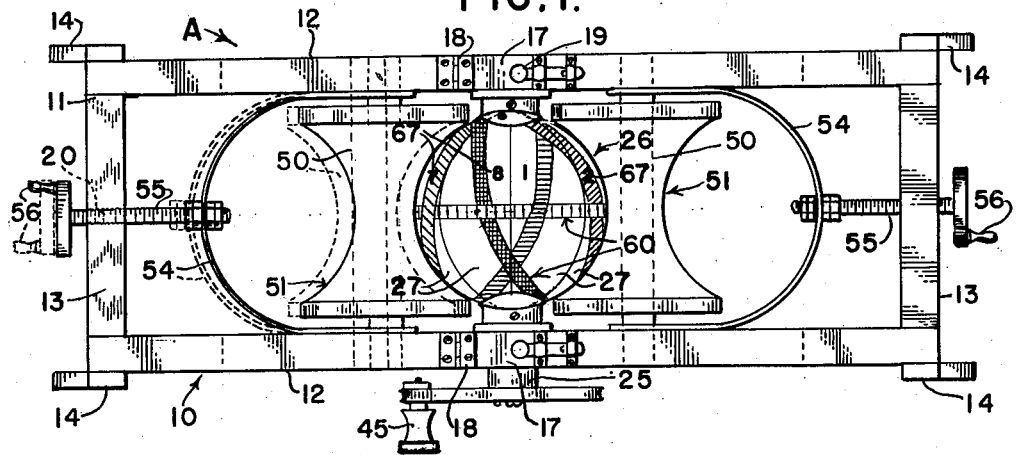
Fig. 1 is a top plan of the apparatus hereinafter disclosed.
Figure 2:
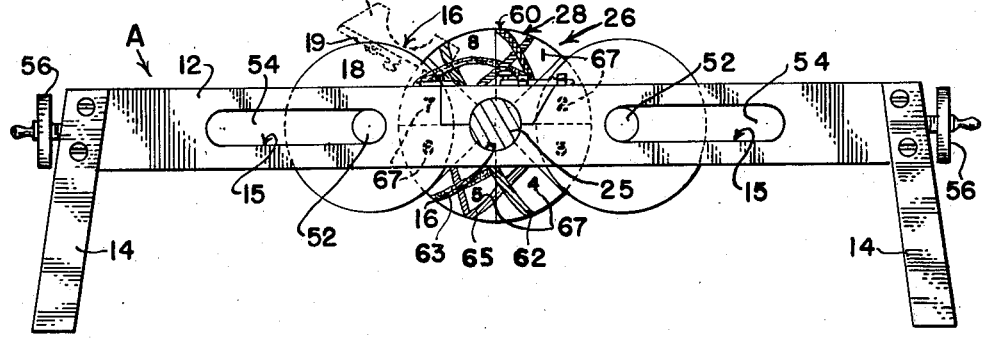
Fig. 2 is a side elevation of the apparatus.
Figure 3:
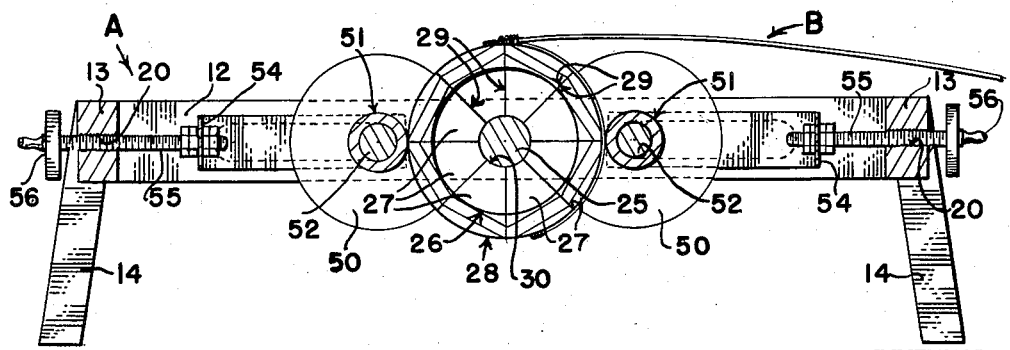
Fig. 3 is a vertical longitudinal section of the apparatus with a section of a strip, adapted to form the product of the apparatus, in place.

In the drawings, wherein for the purpose of illustration is shown a preferred embodiment of the invention and wherein similar reference characters designate corresponding parts throughout the several views, the letter A designates the apparatus; B, strips or strands, as of rattan; and C a hollow body which may be formed on the apparatus A by the strips or strands B and may be a hollow ball.

The apparatus A includes a support structure 10 which may be of metal, wood, hardened plastic material or combinations of them and comprises a preferably substantially horizontally disposed frame 11, with paralleling elongated side members 12 and end members 13, and with the frame 11 mounted upon suitable legs 14.

Each side member 12 has two spaced-apart longitudinally-extending slots 15 providing shaft bearings and, intermediate the inner ends of the slots, a substantially cylindrical opening 16 providing a shaft bearing. This latter bearing is divided and includes a removable section 17, removable in order to lift out the shaft end portion accommodated in the opening 16.

Means is provided to detachably secure the section 17 in place. This may be, for example, a hinge 18 with one leaf carried by the section 17 and the other leaf by the adjacent main portion of the side member 12. A suitable pivoted catch 19 may be carried by the main portion of the side member 12 to slide over a portion of the section 17 to hold it in place.

Each end member 13 may be provided with a screw threaded bore 20 spaced an equal distance from its ends for a purpose to be described.

Carried in the bearings provided by the walls of the openings 16, which axially align, is a shaft 25 and removably mounted upon the shaft 25 is a core or former 26.

In the example shown, the core or former 26 is substantially spherical except for the portion thereof where the shaft 25 projects outwardly therefrom, and is composed of a plurality of segmental sections 27. Each section 27 has an outer arcuate surface 28, faces 29 extending therefrom and converging to a shaft contacting face 30. The face 29 of one section 27 is adapted to contact the adjacent face 29 of the next section 27 and the face 30 contacts the periphery of the shaft 25. The segmental sections 27 are of some substantially unyieldable material as wood, metal or hardened plastic.

Means to removably retain the segmental sections 27 in positions to form the core or former 26 may comprise a pair of spaced apart rings or collars 35 mounted upon the shaft 25 and which may be retained thereon by set screws 36 with the shanks thereof extending through the rings and bearing against the shaft, and an annular flared flange 37 extending from the ring or collar 35 adjacent its inner periphery and adapted to extend over the tips of the segmental sections 27. These rings or collars 35 also provide means to prevent longitudinal movements of the shaft 25 since their outermost faces may contact the inner faces of adjacent parts of the side members 27 and their sections 17.

Means to retain the core or former 26 against rotation independently of the shaft 25 may comprise a set screw 40 with its shank extending through a screw-threaded opening in one flange 37 and against the surface 28 of one of the segmental sections 27.

Any suitable means may be provided to permit the shaft 25 to rotate. This may be a crank 45 at one end of the shaft 25.

Means to cause the strips or strands B to hug the core or former 26 so that they will not migrate or slip from their positions while the hollow body is being formed and also to cause the hollow body to take a substantially spherical shape, includes two rollers 50 having concave peripheries 51 curved to fit the curvature of the core or former 26 and mounted upon shafts 52 with the ends of the shafts 52 projecting outwardly of the end faces 53 of the rollers 50 and carried in the slots 15. This means also includes a bight portion 54 with its free end portions extending about the outer ends of the shaft 52. These bight portions 54 (there are, of course, two of them) are of stout but springy metal and each has rotatably secured at its outermost portion the end of a screw-threaded rod 55 which extends through the screw threaded bore 20 of the adjacent end member 13 and may be provided with a suitable crank 56 at its outer end. Manual rotation of either rod 55 in one direction will cause the roller 50 operatively connected therewith to move toward the core or former 26 and rotation in the other direction will have, of course, the opposite effect. The rollers 50 and shafts 52 may be of wood, metal or plastic material. I have found wood to be suitable.

In order to correctly position the first winding of each length of strips or strands about the core or former 26, I may provide indicia 60 upon the surfaces 28. This indicia may be, for example, bands 61 to 66 inclusive of different colors as blue, green, yellow, red, brown and black, arranged to form the desired pattern. Additionally, so that the segmental portions 27 may be quickly arranged for the bands to align properly I prefer to provide indicia 67 to designate the several segments as, for example, by numerals 1 to 8 inclusive.

An example of the use of the apparatus A is in the formation of substantially cylindrical hollow balls C by the employment of strips B of rattan which are interlaced to provide the surface of the body and a plurality of spaced-apart polygonal openings 70.

The strips B (for example, six strips) of rattan are first soaked in water for up to substantially ten minutes. One end portion of a strip B is then placed about the outer surface of the core or former 26, following, for example, the band 61 and the extremity of the end portion tied, as by threads or string to the adjacent portion of the strip. The extremity of the end portion of another strip B is then slipped under the first strip B and the second strip B caused to follow the band 62, for example, as the core 26 is rotated, and crosses the first strip B, substantially 180° from the point where the second strip B was slipped under the first strip B. The extremity of the end portion of a third strip B is slipped under the second strip B and the third strip B caused to follow the band 63, as the core 26 is rotated, being interlocked with the first and second strips. When portions of all the strips B have been turned around the core 26 in the same relative manner upon rotation of the core, the operator laces further portion of the first strip B to parallel the initially turned portion thereof and does the same in turn with, and in association with, the other strips. The other extremities of the strips are tucked under adjacent strips.

During these operations the two rollers 50 may be employed to exert a selected degree of pressure upon the strips B by loosening or tightening the rods 55 as desired. In the event there may be a variation in the thickness of a strip B, the resilient bight portion 54 will permit transverse movements of the rollers.

When the hollow body C is completed, the operator will move the catches 19 to unloosen the removable sections 17 and raise them. If necessary he may also remove contact of the rollers 50 with the body C. The shaft 25, core 26 and body C may now be removed as a unit, and one ring 35 removed by loosening the set screw 36 associated therewith. This permits the core 26 and body C to be slipped off the shaft 25. The operator will then extract one of the segmental sections 27 through one of the openings 70, whereupon the core 26 will collapse and the other segmental sections 27 may be extracted in the same way.

Rattan, for example, while very pliable when wet, hardens after it has dried and the body C will hold its shape, with the several strips B remaining in place.

In reassembling the sections 27 to make up the core 26, the operator arranges them upon the shaft 25, being guided by the indicia 67, slipping the tips at one end of the segments into the recess formed by the flange 37 of the ring 35 upon the shaft, then slides the other ring 35 in place along the shaft, with the other tips of the segments within the recess defined by its flange 37 and employs the associated set screws 36 and 40 to secure this ring 35 to the shaft 25 and the core 26 against rotation relative to the shaft. The shaft 25 is thereupon placed into the openings 16 and the sections 17 swung into closed positions and secured by the catches 19. The apparatus A is now ready to form another body C.

The rollers 50 not only aid in causing the strips B as they are applied to the form 26 to take a circular course but they also tend to prevent the applied portions of the strips from migrating or moving out of their proper places and, too, aid in preventing the tucked under ends of the strips from accidently slipping out of place.

Various changes may be made to the form of the invention herein shown and described without departing from the spirit of the invention or scope of the claims.

What is claimed is:

1. Apparatus for forming hollow bodies of interlaced strips with an opening between adjacent strips, said apparatus including a frame having side members; a body-forming core rotatably carried by the frame, said core comprising a plurality of segmental sections each having an outer arcuate strip-receiving surface, a pair of shaft-contacting faces and a pair of flat faces converging from said outer surface to said shaft-contacting faces, said segments, at said shaft-contacting faces thereof, defining a pair of shaft-receiving bores and the size and shape of each of said sections being such that the sections may be removed, one by one, through said opening; a shaft removably extending through said bores and outwardly of said core and rotatably carried by said side members; means carried by said shaft to selectively retain said core against collapse and to permit collapse of said core and separation of said sections, including a collar slidably mounted upon said shaft and in rotatable contact with one of said side members, a flange carried by the collar, flaring therefrom and defining a recess removably receiving the end portions at one like end of each of said segmental sections, and means to detachably secure said collar to said shaft.

2. Apparatus for forming hollow bodies of interlaced strips with an opening between adjacent strips, said apparatus including a frame provided with a pair of elongated slots; a body-forming core rotatably carried by the frame, said core comprising a plurality of sections, each section having a strip-receiving surface, the size and shape of each of said sections being such that the sections may be removed, one by one, through said opening, means to selectively retain said core against collapse and to permit collapse of said core and separation of said sections; a roller rotatably and slidably carried by said frame and having a concave periphery shaped to the arc of said core; a shaft for said roller with the ends of the last-named shaft slidably and rotatably retained within said slots; and means to selectively urge said roller toward and away from said core and retain said roller in selected positions including a bight portion of resilient material with its ends loosely carried by the last-named shaft and the intermediate portion of said bight portion disposed with said roller between said intermediate portion and said core.

References Cited in the file of this patent

UNITED STATES PATENTS

| 2,285,334 | Hurt | June 2, 1942 |
| 2,441,564 | Combs | May 18, 1948 |

FOREIGN PATENTS

| 24,767 | Great Britain | Nov. 8, 1904 |